May 20, 1958        R. L. FRANK        2,835,888
MULTIPLE PULSED NAVIGATION SYSTEM
Filed Sept. 27, 1956        2 Sheets-Sheet 1
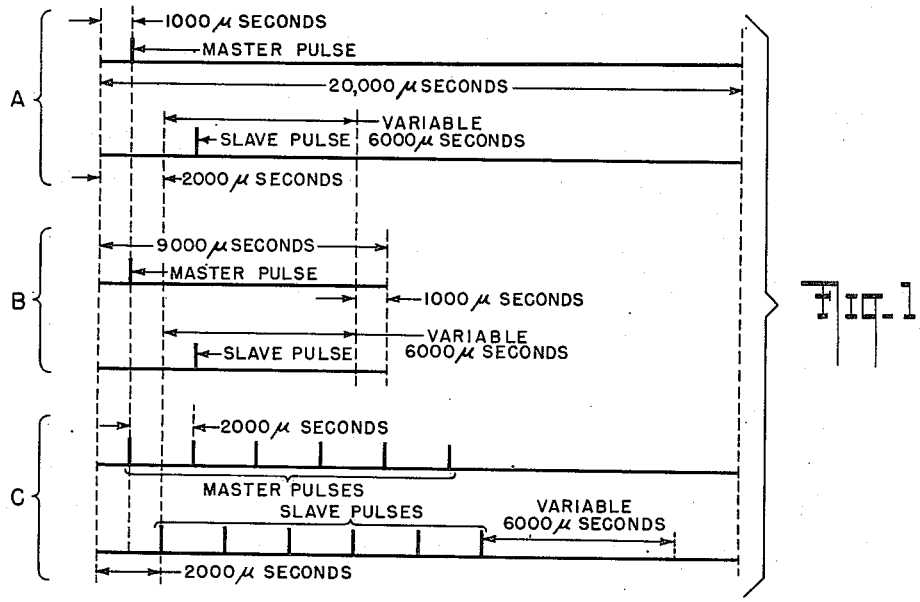
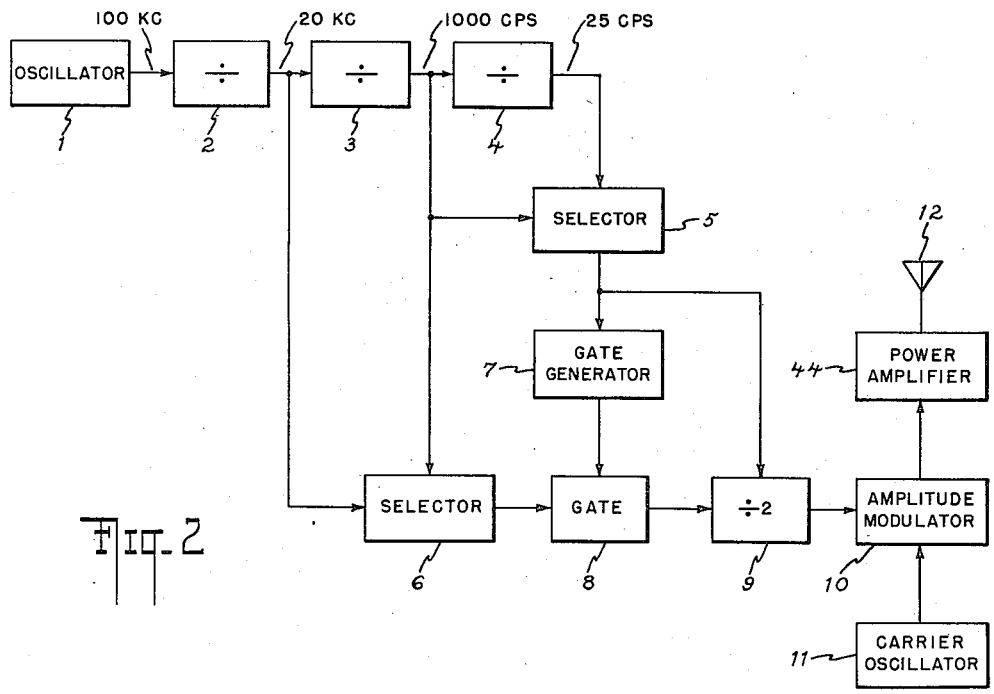
INVENTOR
ROBERT L. FRANK
BY
ATTORNEY May 20, 1958  R. L. FRANK  2,835,888
MULTIPLE PULSED NAVIGATION SYSTEM
Filed Sept. 27, 1956  2 Sheets-Sheet 2
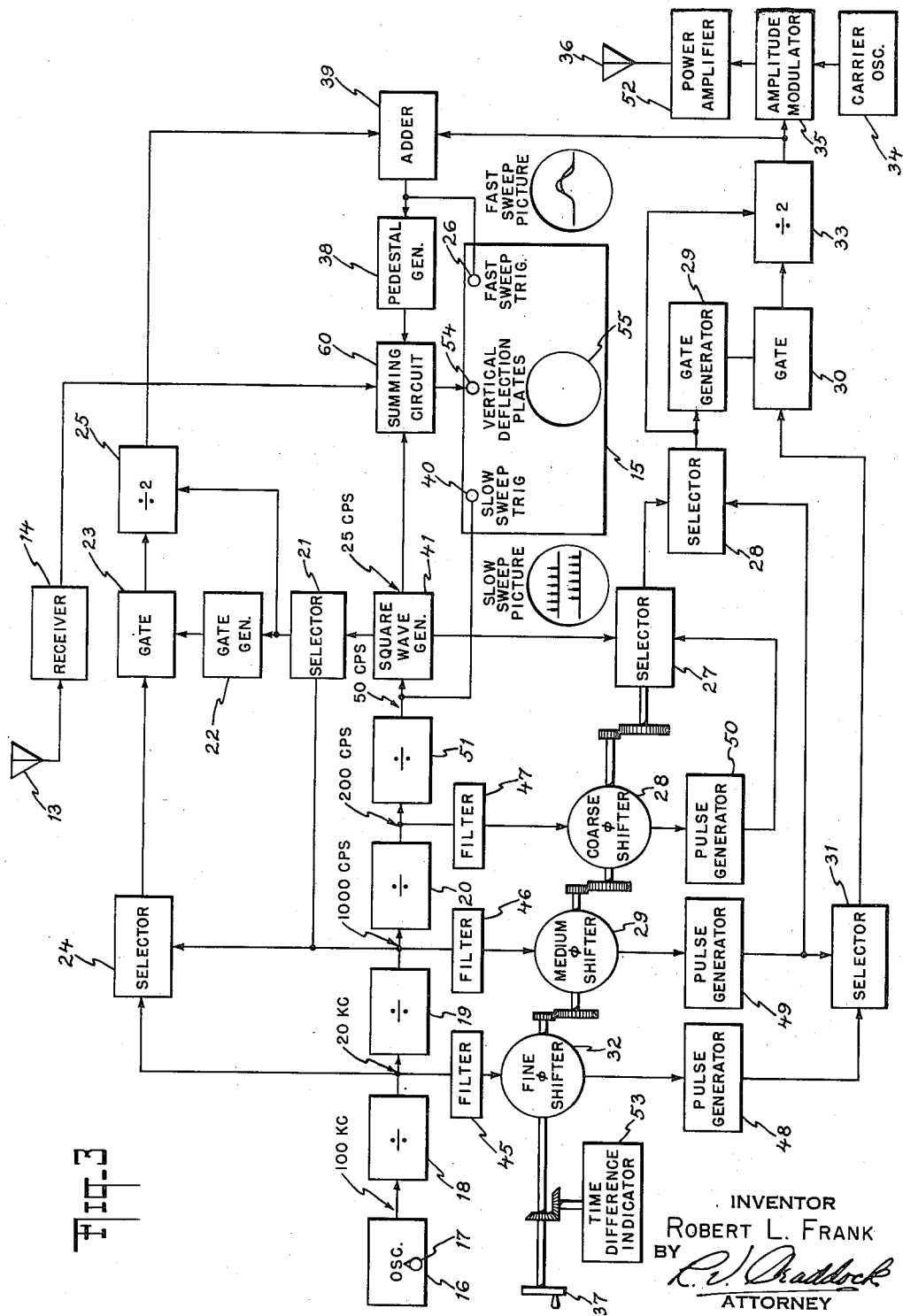
INVENTOR
ROBERT L. FRANK
BY
ATTORNEY

United States Patent Office 2,835,888
Patented May 20, 1958

2,835,888

MULTIPLE PULSED NAVIGATION SYSTEM

Robert L. Frank, Great Neck, N. Y., assignor to Sperry Rand Corporation, a corporation of Delaware Application September 27, 1956, Serial No. 612,425

14 Claims. (Cl. 343—103)

The invention relates to hyperbolic navigation systems of the loran type, and, more particularly, to means for transmitting a group of closely spaced pulses from each of the loran stations, and means for integrating said transmitted pulses at a receiver in order to increase the effective duty cycle of the loran system.

In conventional loran systems, otherwise known as standard loran, a typical transmitting repetition interval is 40,000 microseconds. During this time one pulse is transmitted from the master station and one corresponding pulse is transmitted from an associated slave station. In said typical repetition interval, the master pulse occupies a position displaced by 1,000 microseconds from the start of the interval. The slave pulse, as received by the loran time measuring apparatus, will appear in time displaced from the master pulse by a minimum of 21,000 microseconds. Assuming a typical base line separation between master and slave transmitters of approximately 500 nautical miles, the slave pulse may be received, depending on the position of the receiver within the loran service area, at a time separation from the master pulse having a maximum limit of approximately 27,000 microseconds. The remainder of the 40,000 microsecond basic loran repetition interval, namely, 12,000 microseconds, will not be occupied by any transmitted pulses but rather is provided to allow sufficient time for the sky-wave trains from the last transmitted slave pulse to die out before the next succeeding master pulse is received by the remote time measuring apparatus.

Standard loran systems operate with carrier frequencies of the order of 2 mc. per second. At these frequencies and particularly at night, sky-wave trains can appear on the loran indicator at positions removed from the main pulse by 10,000 or more microseconds. It is well known, however, that the duration of undesired and interfering sky-waves is much reduced when lower carrier frequencies are used such as, for example, 100 kc. per second. Such low carrier frequency loran systems have been in experimental use for several years. A discussion of early work in such direction is contained in Loran, edited by J. A. Pierce et al., published by McGraw-Hill in 1948, beginning on page 97. Although the cited reference discusses a system having a carrier frequency of 180 kc. per second, lower frequency systems utilizing 100 kc. per second carrier frequency have been operated as previously mentioned.

Experience has shown that sky-wave trains, in 100 kc. carrier systems, exist for something less than 2,000 microseconds following a respective transmitted master or slave pulse. It is apparent, therefore, that the conventional 40,000 microseconds (25 C. P. S.) basic loran interval is wasteful of time in such low carrier frequency systems.

In order to increase the effective duty cycle of such loran systems without increasing peak transmitter power, one evident approach is merely to increase the repetition rate inasmuch as there is no longer a need to allow long time intervals between the respective transmitted pulses because of long sky-wave trains. A minimum repetition interval, or conversely a maximum repetition rate of approximately 56 cycles per second can be used in 100 kc. carrier systems while still allowing sufficient time for the appearance of sky-wave trains, for the normal time variation of the slave pulse with respect to the master pulse depending upon receiver position, and for conventional station identification and coding delays.

It is a general object of the present invention to provide a loran navigation system having a higher duty cycle than can be achieved by conventional techniques.

A more specific object is to provide means for producing synchronized groups of closely spaced pulses from each of the master and slave stations.

An additional object is to provide means in a loran receiver for integrating grouped master and slave pulses.

A further object is to achieve better loran system performance in the presence of noise.

These and other objects of the present invention, as will appear as the specification proceeds, are achieved by the provision of means to transmit not single pulses from the master and slave stations but rather groups of closely spaced pulses from each of said stations whereby the effective transmitter duty cycle is increased more than twofold over the maximum duty cycle obtainable merely by increasing the conventional transmitter repetition rate. The invention also provides receiver means for integrating the grouped pulses transmitted from each of the loran stations to produce an enhanced signal indication.

A better understanding of the present invention will be obtained from the following description with the aid of the appended drawings of which:

Fig. 1 discloses representative timing intervals for conventional loran systems in contrast to the modified timing intervals produced by the present invention;

Fig. 2 shows master station transmitting apparatus for producing groups of closely spaced pulses; and Fig. 3 illustrates a representative embodiment of the slave transmitter synchronizer and receiver of the present invention for integrating said closely spaced pulses.

In Fig. 1, time diagram A shows a typical split-trace indication as would appear on a conventional loran receiver-timer. When the repetition rate and phase of the receiver indicating scope has been properly synchronized to the received loran pulses according to conventional practice, the master pulse will appear 1,000 microseconds following the start of the trace. The remaining 20,000 microseconds of the upper trace is provided for the appearance of long-delayed sky-wave trains. In order that the slave pulse will always appear on the lower trace to the right of the master pulse position, a similar 1,000 microseconds delay together with an additional so-called "coding" delay of another 1,000 microseconds, for example, is provided, following which the slave pulse may appear. Assuming a base line separation between master and slave stations of approximately 500 nautical miles, the received slave pulse may appear anywhere between a minimum of 2,000 microseconds following the start of the lower trace and 8,000 microseconds thereafter depending on the position of the remote receiver-indicator with the service area of the loran system. The remaining portion of the lower trace, like that of the remaining portion of the upper trace, is provided for the appearance of long-delayed sky-wave trains.

As previously mentioned, in low carrier frequency systems wherein the master and slave transmissions have carriers of the order of 100 kc., it is not necessary that long intervals of "dead time" be provided for the appearance of long-delay sky-wave trains. Experience has shown that in systems utilizing carriers of the order of 100 kc., sky-wave trains will diminish to an unobjectionable amplitude within approximately 2,000 microseconds following the received master or slave pulses. Therefore, the repetition rate of the 100 kc. systems can be increased in an effort to provide a higher duty cycle of transmission and hence better performance of the system under conditions of interfering noise.

Time diagram B illustrates the ultimate in increased repetition rate that can be obtained following conventional transmitting practice. In diagram B the master pulse appears at 1,000 microseconds delay following the start of the upper trace in a conventional way. However, the upper trace is limited to a total of 9,000 microseconds duration, following which the lower trace commences. The slave pulse appears on the lower trace at a minimum time position of 2,000 microseconds following the start of a lower trace, in a conventional way. As is also conventional practice, a time interval of 6,000 microseconds is provided, following said minimum time position for the slave pulse, to allow for anticipated time excursions between the arrival of the slave and master pulses, depending upon the position of the remote loran receiver-indicator. The remaining 1,000 microseconds of the lower trace of diagram B, together with the first 1,000 microseconds following the start of the upper trace, is now sufficient to allow for any sky-wave trains from the slave pulse to "die out" before the next following master pulse is received. Thus, the overall repetition rate has been increased to approximately 56 cycles per second (corresponding to a total repetition interval of 18,000 microseconds) in contrast to the typical repetition rate of 25 cycles per second (corresponding to a total repetition interval of 40,000 microseconds) as employed in standard loran.

Time diagram C shows an illustrative pulse pattern produced by the present invention in time units comparable to diagrams A and B. In diagram C, a total of six pulses are transmitted both by the master and slave stations. The first master pulse appears on the upper trace of the loran receiver-indicator at a position displaced by 1,000 microseconds from the start thereof. Each pulse is separated in time by approximately 2,000 microseconds to allow for the diminution of sky-wave trains from preceding pulses. The total duration of the upper trace is 20,000 microseconds (for the purposes of comparison with a standard loran interval). The six pulses indicated on the lower trace of diagram C represent pulses received from the slave station corresponding to the six pulses emitted by the master station. In a fashion analogous to conventional station identification practice, the first slave pulse appears to the right of the first master pulse by the provision of a conventional 2,000 microseconds delay following the start of the lower trace. Thus, the position of the six slave pulses shown in diagram C correspond to a minimum time difference reading.

An additional 6,000 microseconds is provided on the lower trace following the occurrence of the last of the six slave pulses to allow for the time excursion of the group of slave pulses which depends on the position of the remote receiver-indicator. Yet another 2,000 microseconds interval is provided beyond the 6,000 microseconds excursion interval just described to provide for the diminution of the sky-wave trains following the slave pulses so that the next succeeding master pulse train is not contaminated therewith.

It can be seen with the aid of diagram C that six pulses from each station are provided within the same 40,000 microseconds basic interval as utilized in standard loran. Thus, an effective six-fold increase in duty cycle has been accomplished over conventional loran practice. The effective repetition rate of the pulses shown in diagram C is 150 cycles per second which represents a factor of increase of approximately 2.7 over the maximum repetition rate shown in diagram B following a straightforward extension of conventional practice as shown in diagram A.

Fig. 2 illustrates a representative embodiment of a master transmitter adapted, according to the present invention, to produce a series of closely spaced pulses (hereinafter called multiple pulses).

Numeral 1 generally indicates a highly stabilized frequency standard operating, for example, at a frequency of 100 kc. The pulsed output of oscillator 1 is successively divided, in conventional dividing stages 2, 3, and 4. In the representative case chosen, the output from divider 2 is at 20 kc., the output from divider 3 is at 1,000 C. P. S., while the output of divider 4 is at 25 C. P. S. The 25 C. P. S. output of divider 4 is applied to one input of selector 5, a second input to which is derived from the 1,000 C. P. S. output of divider 3. Selector 5 produces a pulsed output having a repetition rate of 25 C. P. S. which is phase stabilized with the precision of the 1,000 C. P. S. pulsed output from divider 3.

The output of selector 5 triggers gate generator 7 which in turn produces a voltage pedestal whose leading edge coincides with the time of occurrence of the output pulse from selector 5 and whose trailing edge occurs 12,000 microseconds thereafter. Gate generator 7 may be a conventional monostable multivibrator. The output of generator 7 places gate 8 in a condition to conduct to pass the output pulses from selector 6 which occur during the interval between the leading and trailing edges of the waveform output of generator 7. One input to selector 6 is obtained from the 1,000 C. P. S. output of divider 3 while its second input is derived from the 20 kc. output of divider 2. Selector 6 produces an output pulse having a repetition rate determined by the 1,000 C. P. S. input and having a phase stability governed by that of the 20 kc. input thereto.

The output of gate 8 is thus a series of 12 pulses, each separated by 1,000 microseconds (corresponding to a repetition rate of 1,000 C. P. S.), having a phase stability determined by that of 20 kc. signal output of divider 5 and having a group repetition rate determined by the 25 C. P. S. output of divider 4.

As previously described, however, it is desired to separate the multiple pulses by 2,000 microsecond time units in order to allow sufficient time for the diminution of objectionable sky-wave trains following transmission of master and slave pulses. Such a time separation may be achieved by the addition of divide-by-two circuit 9, one input of which is derived from the output of gate 8, the second input to which is obtained from the output of selector 5. Circuit 9 may be a conventional bistable multivibrator. The output of selector 5 serves to reference the state of conduction of divide-by-two circuit 9 so that it will always respond in a known manner to the train of 12 pulses, separated by 1,000 microseconds, appearing at the output of gate 8. The output of divide-by-two circuit 9 is thus a train of 6 pulses, separated by 2,000 microseconds and having a group repetition rate of 25 C. P. S. Said output is then applied to amplitude modulator 10 through which the signal of carrier oscillator 11 flows. The amplitude modulated output of modulator 10 is amplified in power amplifier 44 and radiated via antenna 12.

Fig. 3 illustrates a representative embodiment of a slave transmitter synchronizer and receiver adapted, according to the present invention, to produce multiple pulses after a predetermined length of time following reception of respective master multiple pulses. A primary frequency reference in the form of oscillator 16 is provided in the slave receiver-synchronizer. Means are provided, as indicated by control knob 17, for adjusting the frequency of oscillator 16 over a limited range. The pulse output of oscillator 16 is successively divided in divider stages 18, 19, 20 and 51 and by square wave generator 41 whose output frequency is one-half that of the pulses applied thereto as derived from the output of divider 51. The interconnection of selector 21, gate generator 22, gate 23, selector 24, and divide-by-two circuit 25 is precisely the same as previously described in connection with the master transmitter and operates to produce at the output of divide-by-two circuit 25 a series of multiple pulses having a group repetition rate and time separation between the sequential pulses equivalent to that produced by the master transmitter.

The additional apparatus shown in Fig. 2 is provided to produce a second series of multiple pulses also precisely the same as the master multiple pulses but occurring an adjustable length of time following the reception of the master pulses. For this purpose, a divider chain, resolver-type phase shifter and selector apparatus is employed similar to that shown in Fig. 7 of U. S. Patent No. 2,731,634, issued to W. Palmer on January 16, 1956, and described therein. While the pulse selection techniques embodied in the phase shift apparatus is basically the same as that used in the previously described master transmitting apparatus, it is necessary to provide the additional components comprising filters 45, 46 and 47 and pulse generators 48, 49 and 50. The filters are required, in the representative embodiment of Fig. 3, in order to convert the pulses appearing along the divider chain into sine waves of equal frequency for application to the phase shifters. Conversely, the pulse generators 50, 49 and 48 reconvert the phase shifted sine wave outputs of phase shifters 28, 29 and 32 into pulses of equal frequency for application to the respective selectors 27, 28 and 31.

Neglecting said filters and pulse generators for the purpose of simplification, the 25 cycle output of square wave generator 41, having a phase opposite to that applied to selector 21, is applied to a first input of selector 27, a second input to which is obtained from the output of coarse phase shifter 28. The input to coarse phase shifter 28 is obtained from a 200 C. P. S. output of divider 20. The output of selector 27 is applied to a first input of selector 28, a second input of which is derived from the 1,000 C. P. S. output of medium phase shifter 29. The 1,000 C. P. S. output of divider 19 is applied to the input of phase shifter 29.

The output of selector 28 triggers gate generator 29 to produce a voltage waveform whose leading edge is coincident with the output of selector 28 and whose trailing edge occurs 12,000 microseconds thereafter. The output of gate generator 29 is applied to gate 30 which passes pulses appearing at the output of selector 31 during the 12,000 microsecond time interval of the output of gate generator 29. Selector 31 derives a first input from the output of medium phase shifter 29 and obtains its second input from the output of fine phase shifter 32.

Phase shifters 32, 29 and 28 are mechanically ganged together via a gear train having successive ratios corresponding to the ratio of the frequency inputs to the respective phase shifters and are positioned by means of manual control 37. Time difference indicator 53 displays the microsecond time equivalent of the position of the gear train in a conventional manner.

The output of gate 30 is applied to a first input of divide-by-two circuit 33, a second input of which is obtained from the output of selector 28. The output of divide-by-two circuit 33 amplitude modulates the output signal of carrier oscillator 34 by means of amplitude modulator 35. The amplitude modulated slave carrier is amplified in power amplifier 52 and then radiated by antenna 36.

Master multiple pulses are received and amplitude detected by antenna 13 and receiver 14 and applied to the vertical deflection plate input 54 of conventional loran indicator 15 via summing circuit 60. Other conventional inputs to the vertical deflection plates of indicator 15 include a trace separation voltage derived from the output of square wave generator 41 and master and slave pedestals which are derived from pedestal generator 38, the input to which is obtained from adder 39 wherein the outputs of divide-by-two circuits 25 and 33 are summed.

Included within conventional indicator 15 are sweep circuits for producing the normal slow and fast sweeps. The fast sweep trigger input 26 is obtained from the output of adder 39 while the slow sweep trigger input 40 is derived from the 50 C. P. S. output of divider 51.

In operation, the fine, medium and coarse phase shifters 32, 29 and 28 are set via manual control 37, according to the desired coding delay to be employed at the slave station. In a fashion very similar to conventional practice, the received and detected multiple pulses from the master station are viewed on cathode ray tube 55 of indicator 15. The multiple pedestal outputs of pedestal generator 38 will appear on the slow sweep trace of indicator 15 at some arbitrary time position with respect to the occurrence of the 6 multiple master pulses. Frequency control 17 is then adjusted to vary the frequency of oscillator 16 to position the multiple master pulses on top of the multiple master pedestals. The multiple master pulses are distinguished as against the multiple slave pulses radiated and received via antennas 36 and 13 in a conventional manner based upon the fact that at the slave station only the master pulses can be moved relative to the pedestals by varying the oscillator control 17. When multiple master pulses are thus superimposed on the multiple master pedestals, the slow sweep circuit of indicator 15 is deenergized and the fast sweep circuit is energized.

In the fast sweep mode of operation, all 6 multiple master pulses will appear as a single pulse inasmuch as a new sweep is traced on the face of scope 55 in response to each of the multiple sweep triggers derived from the output of adder 39. The resulting signal indication is enhanced as a result of phosphor integration on the indicator face and the additional integration by the eye of the human observer-operator. Fine adjustment of frequency control 17 can now be made to position the single superimposed master pulse appearing on indicator 15 with respect to a reference position after the start of the trace in order that the phase of oscillator 16, from which the fast trace triggers are obtained, may be finely referenced with respect to the arrival of the master multiple pulses at the slave receiver. When the master pulse is thus positioned with respect to the start of the fast trace, there will appear at the output of divide-by-two circuit 33 a series of 6 slave multiple pulse triggers which occur a fixed time following the reception of the 6 multiple master pulses as determined by the setting of control 37 of phase shifters 32, 29 and 28. As previously described, said slave multiple triggers amplitude modulate the output signal of oscillator 34 to produce the slave multiple pulses which are radiated by antenna 36.

A representative remote receiver-indicator is obtained by the omission of oscillator 34, amplitude modulator 35, power amplifier 52 and antenna 36 which comprise the slave transmitter proper of Fig. 3. The operation of the remote receiver-indicator follows that of the slave transmitter synchronizer and receiver except that manual control 37 is not set to a predetermined position corresponding to the desired slave coding delay but is instead adjusted to obtain an envelope match between the received master and slave multiple pulses in accordance with well-known practice, a brief summary of which follows:

The first step prerequisite to obtaining a time interval measurement between received master and slave pulses is to approximately position the master multiple pulses with respect to the master multiple pedestals at the start of the upper trace during the slow speed mode of operation of conventional loran indicator 15. Manual control 17 is positioned to finely vary the frequency of oscillator 16 so as to position the received multiple master and slave pulses, impressed on the vertical deflection plate of indicator 15 with respect to the sweep traced on the face of said indicator. The master pulses are distinguished from the slave pulses on the basis of the standard time separation between the respective groups of master and slave pulses whereby the slave pulse group follows the master pulse group by a time interval which is more than one-half of the total time interval displayed by indicator 15. When the six multiple master pulses are positioned on top of the six multiple master pedestals, manual control 37 is adjusted to vary the time of occurrence of the six multiple slave pedestals so that they lie under the six multiple slave pulses as shown in the slow sweep picture of Fig. 3.

It is to be noted that the six master and slave multiple pulses respectively appear as single resultant pulses during the fast sweep mode of operation because of the fact that individual fast sweeps are traced on the face of indicator 15 in response to each of the multiple fast sweep triggers derived from adder 39. A final precision envelope match is then made using the integrated resultant pulses as shown in the fast sweep picture of Fig. 3.

Thus, the manipulation of a remote receiver adapted to receive the multiple master and slave pulses of the present invention, is precisely the same as is the conventional practice in obtaining a time difference reading between single master and slave pulses.

It can be seen from the foregoing description that the objects of the present invention have been achieved by the provision of means at the master station for producing multiple pulses and by the provision of corresponding means at the slave station for producing corresponding multiple slave pulses a predetermined length of time following the reception at the slave station of the master multiple pulses. The enhanced system performance in the presence of interfering noise has been achieved by the provision of integrating means, according to the present invention, for summing the grouped master and slave pulses on the face of the receiver cathode ray tube indicator.

Although in the illustrative embodiments of Figs. 2 and 3 means are shown for producing a series of uniformly spaced multiple pulses, other time spacing between the pulses comprising a group may be used. It is within the purview of the invention to produce non-uniformly spaced multiple pulses and a corresponding non-uniformly spaced series of multiple cathode ray tube sweep triggers whereby integration of the received multiple pulses is achieved on the face of the cathode ray tube indicator.

Additionally, means for integrating the received multiple pulses, other than a cathode ray tube, may be employed such as, for example, the integrating filters 124 and 252 of Fig. 1 of U. S. Patent 2,697,219, issued on December 14, 1954, in the name of R. B. Williams, Jr., and assigned to the present assignee. In such a case it is required that separate integrating means be employed for each series of multiple pulses transmitted from the respective stations and that each integrating means be synchronized to operate at the time of reception of its respectively associated series of multiple pulses.

While the invention has been described in its preferred embodiments it is to be understood that the words which have been used are words of description rather than of limitation and that changes within the purview of the appended claims may be made without departing from the true scope and spirit of the invention in its broader aspects.

What is claimed is:

1. A multiple-pulsed loran navigation system comprising at least a master station, slave station and receiver-indicator; said master station including means for generating and transmitting a first series of grouped pulses wherein the time separation betwen corresponding pulses of the successive groups define the system repetition interval and wherein the time separation between successive pulses in each group is at least equal to the time required for sky-waves to diminish within the service area of the system; said slave station including means to receive said first pulses, means to generate a second series of grouped pulses corresponding to said first pulses, means for controllably delaying said second pulses a predetermined amount following the reception of said first puslses and means to transmit said delayed second pulses, and said receiver-indicator including means to receive said first and said delayed second pulses, means for integrating said received pulses, means to generate a third series of grouped pulses corresponding to said first pulses, means for synchronizing said third pulses with said integrated first pulses, means for controllably delaying said third pulses to produce a fourth series of grouped pulses, means for indicating synchronism between said fourth pulses and said integrated delayed second pulses, and means for measuring the time delay between said third pulses and said fourth pulses.

2. Apparatus as defined in claim 1 wherein said means for generating said series of grouped pulses includes a source of substantially uniformly spaced first pulses, a divider chain responsive to said first pulses to produce a plurality of second pulses each having a repetition rate related to that of said first pulses by a predetermined ratio, at least a first and a second pulse selector each adapted to receive a different higher and a different lower frequency one of said second pulses to respectively produce first and second outputs in time synchronism with the higher frequency one of said second pulses and having a repetition rate determined by the lower frequency one of said second pulses, a first gate generator adapted to receive said first output to produce a first wave having a leading edge coincident therewith and a trailing edge at a predetermined time thereafter, and first gating means adapted to receive said first wave and said second output and operative to pass said second output during the interval between the leading and trailing edges of said first wave.

3. Apparatus as defined in claim 2 wherein said means for controllably delaying said pulses includes a plurality of ganged phase shifters each adapted to receive and operative to delay a different frequency one of said second pulses, at least a third and a fourth pulse selector each responsive to a different higher and a different lower frequency one of said delayed second pulses to respectively produce third and fourth outputs in time synchronism with the higher frequency one of said delayed second pulses and having a repetition rate determined by the lower frequency one of said delayed second pulses, a second gate generator adapted to receive said third output to produce a second wave having a leading edge coincident therewith and a trailing edge at said predetermined time thereafter, and second gating means adapted to receive said second wave and said fourth output and operative to pass said fourth output during the interval between the leading and trailing edges of said second wave.

4. Apparatus as defined in claim 1 wherein said means for indicating synchronism comprises a cathode ray tube indicator having a first and second orthogonal deflecting means, a sweep generator coupled to said first deflecting means, said sweep generator adapted to be triggered by said fourth pulses and said second deflection means adapted to receive said delayed second pulses.

5. Apparatus as defined in claim 1 wherein said means for integrating comprises a cathode ray tube having first and second orthogonal deflection means, said received first and said received delayed second pulses being applied to said first deflection means, a sweep generator coupled to said second deflection means, and means for triggering said sweep generator, said triggering means being responsive to said means for synchronizing and said means for controllably delaying.

6. Apparatus for receiving and measuring the time difference between a first series of grouped pulses and at least a second series of grouped pulses corresponding to said first series but time-displaced therefrom, said apparatus comprising means to receive said first and said second series of said grouped pulses, means for integrating said received pulses, means to generate a third series of grouped pulses corresponding to said first series, means for synchronizing said third series with said integrated first series, means for controllably delaying said third series in time to produce a fourth series of grouped pulses, means for indicating synchronism between said fourth series and said integrated second series, and means for measuring the time delay between said third series and said fourth series.

7. Apparatus as defined in claim 6 wherein said means for integrating includes a cathode ray tube having first and second orthogonal deflection means, said received first and said received second pulses being applied to said first deflection means, a sweep generator coupled to said second deflection means, and means for triggering said sweep generator, said triggering means being responsive to said means for synchronizing and said means for controllably delaying.

8. Apparatus as defined in claim 6 wherein said means to generate said third series of grouped pulses includes a source of substantially uniformly spaced first pulses, a divider chain responsive to said first pulses to produce a plurality of second pulses each having a repetition rate related to that of said first pulses by a predetermined ratio, at least a first and a second pulse selector each adapted to receive a different higher and a different lower frequency one of said second pulses to respectively produce first and second outputs in time synchronism with the higher frequency one of said second pulses and having a repetition rate determined by the lower frequency one of said second pulses, a first gate generator adapted to receive said first output to produce a first wave having a leading edge coincident therewith and a trailing edge at a predetermined time thereafter, and first gating means adapted to receive said first wave and said second output and operative to pass said second output during the interval between the leading and trailing edges of said first wave.

9. Apparatus as defined in claim 6 wherein said means for indicating synchronism comprises a cathode ray tube indicator having a first and second orthogonal deflection means, a sweep generator coupled to said first deflecting means, said sweep generator adapted to be triggered by said fourth series and said second deflection means adapted to receive said second series.

10. Apparatus as defined in claim 8 wherein said means for controllably delaying said third series includes a plurality of ganged phase shifters each adapted to receive and operative to delay a different frequency one of said second pulses, at least a third and a fourth pulse selector each responsive to a different higher and a different lower frequency one of said delayed second pulses to respectively produce third and fourth outputs in time synchronism with the higher frequency one of said delayed second pulses and having a repetition rate determined by the lower frequency one of said delayed second pulses, a second gate generator adapted to receive said third output to produce a second wave having a leading edge coincident therewith and a trailing edge at said predetermined time thereafter, and second gating means adapted to receive said second wave and said fourth output and operative to pass said fourth output during the interval between the leading and trailing edges of said second wave.

11. Apparatus for transmitting a first series of multiple pulses and a third series of multiple pulses corresponding to said first series and in response thereto and at a controllable length of time thereafter, said apparatus comprising a first transmitter including means for generating and transmitting said first series of multiple pulses; and a second transmitter including means to receive said first series of multiple pulses, means to integrate said received pulses, means to generate a second series of multiple pulses corresponding to said first series, means for synchronizing said second series with said integrated received pulses, means for controllably delaying said second series of pulses in time to produce said third series of multiple pulses and means for transmitting said third series.

12. Apparatus as defined in claim 11 wherein said means for generating said series of multiple pulses comprises a source of substantially uniformly spaced first pulses, a divider chain responsive to said first pulses to produce a plurality of second pulses each having a repetition rate related to that of said first pulses by a predetermined ratio, at least a first and a second pulse selector each adapted to receive a different higher and a different lower frequency one of said second pulses and having a repetition rate determined by the lower frequency one of said second pulses, a first gate generator adapted to receive said first output to produce a first wave having a leading edge coincident therewith and a trailing edge at a predetermined time thereafter, and first gating means adapted to receive said first wave and said second output and operative to pass said second output during the interval between the leading and trailing edges of said first wave.

13. Apparatus as defined in claim 11 wherein said means to integrate includes a cathode ray tube having first and second orthogonal deflection means, said received first pulses being applied to said first deflection means, a sweep generator coupled to said second deflection means, and means for triggering said sweep generator, said triggering means being responsive to said means for synchronizing.

14. Apparatus as defined in claim 12 wherein said means for controllably delaying said second pulses includes a plurality of ganged phase shifters each adapted to receive and operative to delay a different frequency one of said second pulses at least a third and a fourth pulse selector each responsive to a different higher and a different lower frequency one of said delayed second pulses to respectively produce third and fourth outputs in time synchronism with the higher frequency one of said delayed second pulses and having a repetition rate determined by the lower frequency one of said delayed second pulses, a second gate generator adapted to receive said third output to produce a second wave having a leading edge coincident therewith and a trailing edge at said predetermined time thereafter, and second gating means adapted to receive said second wave and said fourth output and operative to pass said fourth output during the interval between the leading and trailing edges of said second wave.

No references cited.